United States Patent [19]

Sermund

[11] Patent Number: 5,459,296
[45] Date of Patent: Oct. 17, 1995

[54] METHOD FOR THE LOW-MAINTENANCE OPERATION OF AN APPARATUS FOR PRODUCING A SURFACE STRUCTURE, AND APPARATUS

[75] Inventor: Gerald Sermund, Kiel, Germany

[73] Assignee: Sidmar N.V., Gent, Belgium

[21] Appl. No.: 78,284

[22] PCT Filed: Dec. 15, 1990

[86] PCT No.: PCT/DE91/00968

§ 371 Date: Nov. 1, 1993

§ 102(e) Date: Nov. 1, 1993

[87] PCT Pub. No.: WO92/10327

PCT Pub. Date: Jun. 25, 1992

[30] Foreign Application Priority Data

Dec. 15, 1990 [DE] Germany .......................... 40 40 201.0

[51] Int. Cl.[6] .......................... B23K 15/08; B23K 15/00
[52] U.S. Cl. .................. 219/121.02; 219/121.16; 219/121.26; 219/121.35
[58] Field of Search .................. 219/121.12, 121.21, 219/121.26, 121.35, 121.25, 121.16

[56] References Cited

U.S. PATENT DOCUMENTS

| | | | |
|---|---|---|---|
| 3,162,749 | 12/1964 | Peracchio et al. | |
| 3,192,318 | 6/1965 | Schleich et al. | |
| 3,763,346 | 10/1973 | Drechsler et al. | 29/121.12 |
| 3,817,592 | 6/1974 | Swanson | 316/26 |
| 3,895,602 | 7/1975 | Bobenrieth | 118/49.1 |
| 4,041,273 | 8/1977 | Francisco et al. | 219/121.12 |
| 4,452,647 | 6/1984 | Sailas. | |
| 4,959,841 | 9/1990 | Johnson | 373/10 |

FOREIGN PATENT DOCUMENTS

| | | |
|---|---|---|
| 195730 | 6/1957 | Germany. |
| 1253841 | 7/1962 | Germany. |
| 1515249 | 9/1969 | Germany. |

OTHER PUBLICATIONS

Patent Abstracts Of Japan, vol. 13, No. 95 (C–573) (3443), Mar. 6, 1989, JP-A-63 274 779 (Mitsubishi Heavy Ind., Ltd.), Nov. 11, 1988.
Electrochemical Society, San Francisco, May 12–17, 1974, abstract No. 215, Electron Beam Machining–The Process And Its Application, D. F. von Dobeneck, see p. 215, par. 1–p. 216, par. 4.

Primary Examiner—Mark H. Paschall
Attorney, Agent, or Firm—Hill, Steadman & Simpson

[57] ABSTRACT

An apparatus for producing surface structures on a drum with an electron beam, comprising beam equipment having a beam generator that generates the electron beam, a focal length adjustment as well as a focusing adjustment, and a vacuum chamber which accepts the roller, the beam equipment comprising a passage for the electron beam in a wall that separates the beam equipment from the vacuum chamber, the passage being fashioned as a nozzle having a nozzle jacket whose inside diameter is selected such that the electron beam defocused with the focusing adjustment charges at least a part of the nozzle jacket in a cleaning interval, the nozzle jacket comprising a nozzle base secured in the wall and an end segment that projects beyond the wall in a direction toward the vacuum chamber, and a taper connecting said end segment to the nozzle base, the taper being radially limited by a channel, and a method of operating such an apparatus.

18 Claims, 6 Drawing Sheets

METHOD FOR THE LOW-MAINTENANCE OPERATION OF AN APPARATUS FOR PRODUCING A SURFACE STRUCTURE, AND APPARATUS

BACKGROUND OF THE INVENTION

The invention is directed to a method for the low-maintenance operation of an apparatus for producing surface structures on a roller with an electron beam, whereby the electron beam is charged by a focusing for variation of its bundling and whereby the apparatus is composed of a vacuum chamber for the acceptance of the roller as well as of a beam equipment that generates the electron beam, said beam equipment comprising a passage for the electron beam in a wall that separates the beam equipment from the vacuum chamber.

Over and above this, the invention is directed to an apparatus for the implementation of the method, said apparatus being composed of a beam equipment having a beam generator that generates the electron beam, of a focal length adjustment as well as having a focusing, and of a vacuum chamber that accepts the roller, whereby the beam equipment comprises a passage for the electron beam in a wall that separates the beam equipment from the vacuum chamber.

Different methods have been applied for producing such rollers that, for example, are fashioned as textured rollers or dressing rollers and are particularly employed for producing a surface structure on sheet steel. On the one hand, particle charging with steel grit corresponding to a shot hole has been carried out; on the other hand, depressions were produced on the roller by electro-erosion or by processing with a laser. Electro-erosion or particle charging with steel grit, however, leads to recesses or depressions limited by sharp edges whose edge regions tend to break off and, thus, to develop dust. In electro-erosion and in laser charging, an oxidation of the roller metal and, thus, a formation of ash also can occur. The plurality of depressions to be produced on the roller surface also is limited by the inertia of the mirrors employed when processing with lasers.

In the manufacture of printing cylinders for rotogravure, depressions or cups that accept the inks during later printing are produced on the roller surface with the assistance of the electron beam. Crater walls potentially arising in the production of the depressions are eroded after the conclusion of the cylinder engraving.

DE-AS 28 40 702 discloses a method and an apparatus for improving the quality of fine steel sheets. It is recited in this publication that a surface structure on the roller surface ensues with the assistance of an intermittent energy beam along a helical path. It is particularly cited that a laser beam can be employed as the energy beam. However, it is also pointed out that an electron beam can be employed. Specific references to description of the implementation of a method upon employment of an electron beam or for constructing an apparatus that applies this method are not recited.

EP-A-0 119 182 discloses that a roller surface can be charged with the assistance of a laser beam or an electron beam. A helical path on the roller surface is produced with the assistance of the beam. In particular, it discussed how to blow a gas, for example oxygen, into the region of the beam charging. As a result of the presence of oxygen, an oxidation of the roller metal ensues in the region of the beam charging. The formation of a crater wall that surrounds a recess produced by the beam is thereby largely avoided, since the material that evaporates or that is hurled from the recess in its molten condition reacts very quickly with the oxygen.

EP-B-0 108 376 discloses that the engraving of printing cylinders be implemented with the assistance of an electron beam charging and to guarantee an after-engraving relative to an engraving that has already ensued on the basis of a special single-phase procedure. The topical arrangement of the recesses on the printing cylinder produced with the assistance of the apparatus disclosed in this publication is prescribed by the printing format that is to be produced.

As discussed therein, the particles stripped from the roller material in the production of the recesses on the roller surface are at least partly evaporated due to the high temperatures prevailing in the region of the electron beam charging. After cooling, a major part of this vapor precipitates in a vacuum chamber that accepts the roller. A more highly pronounced vacuum usually prevails in the region of the beam equipment than in the region of the vacuum chamber. This leads to the fact that evaporated material particles can penetrate into the region of the beam equipment.

The majority of these penetrating material particles precipitate in the region of a passage that is arranged within a wall separating the beam equipment from the vacuum chamber and that enables a transfer of the electron beam from the beam equipment into the vacuum chamber. Particularly given an interaction with a cooling that tempers the wall in the region of the passage, one must count on the passage growing shut. When engraving a steel roller, a few cubic centimeters of metal are evaporated and the region of the passage can grow shut within a time span of approximately 30 through 60 minutes due to this considerable number of material particles. The exact positioning of the electron beam can be deteriorated before the passage completely grows shut. Over and above this, one must count on a considerable, local temperature rise given a permanent incidence of the electron on the regions growing shut, this potentially leading to damage to the apparatus. In order to avoid these disadvantages, a frequent replacement of an insert arranged in the region of the passage or, respectively, a frequent cleaning of the passage were required in the past. These maintenance jobs require a not insubstantial work outlay and involve interruptions in production.

SUMMARY OF THE INVENTION

It is therefore an object of the present invention to improve a method of the species initially cited such that a growth of evaporated material in the region of the passage which deteriorates the functionability is avoided in order to achieve a long operating duration.

To this end, in an embodiment the invention provides that at least one region of the passage of such apparatus is heated by the electron beam during at least one cleaning interval in order to evaporate material particles deposited on the passage for the purpose of cleaning the passage.

A further object of the present invention is to improve an apparatus of the species initially cited such that a low-maintenance operation is enabled.

To this end, in an embodiment the invention provides that the passage is fashioned as a nozzle that is composed of a nozzle channel and of a nozzle jacket surrounding the nozzle channel; the inside diameter of the nozzle jacket is selected such that the electron beam defocused with the focusing charges at least a part of the nozzle jacket in a cleaning interval; the nozzle jacket is essentially composed of a nozzle base held in the wall and of an end segment projecting beyond the wall in the direction toward the vacuum chamber, this end segment being connected to the nozzle base via the taper; and the taper is radially limited by a channel.

It becomes possible with the assistance of this method and of this apparatus to re-evaporate material particles that precipitated in the region of the passage and to remove them from the environment of the passage. The cleaning interval can be advantageously placed in a time interval wherein a change of the engraving location on the roller is undertaken. The electron beam is defocused during this change and cannot lead to material modifications on the moving roller. However, a considerable temperature rise that results in a cleaning can be achieved in the region of the stationary passage on the basis of a suitably defocused electron beam. Due to the arrangement of the nozzle in the region of the passage, it is guaranteed over and above this that a localization of the high temperature level ensues in addition to an easy interchangeability, even given an automatic self-cleaning. Over and above this, a suitable material selection for the nozzle material is possible in order to achieve optimum endurance on the basis of the combination of a specific material for the wall with another specific nozzle material.

The taper of the nozzle jacket guarantees that the nozzle end can be heated to a comparatively high temperature without an impermissible temperature increase occurring in the remaining region of the nozzle. It thereby also becomes possible, in particular, to heat that nozzle region to a great extend which faces toward the source of the vapor particles and is affected to an especially great degree by sintering effects. Due to the projection of the nozzle, direct contact of the end segment with the wall and, thus, a direct temperature transmission are avoided. This temperature transmission, on the one hand, would deteriorate the desired, great heating of the end segment; second, a coolant circulation arranged inside the wall for tempering would be unnecessarily stressed.

These and other features of the present invention are set forth in the following detailed description of the presently preferred embodiments and the attached drawings.

DETAILED DESCRIPTION OF THE PRESENTLY PREFERRED EMBODIMENTS

Figure 1:
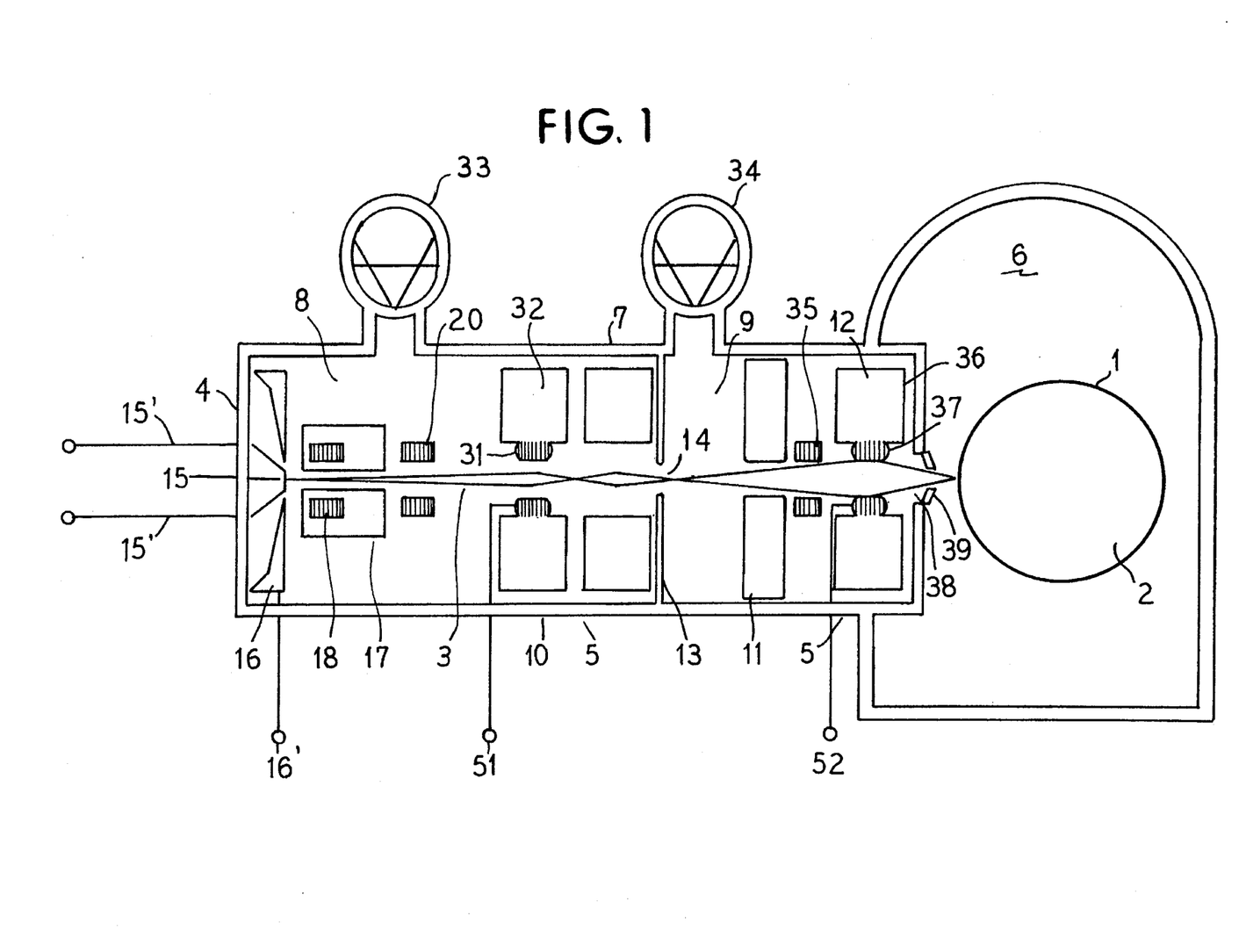
FIG. 1 is a schematic illustration of an apparatus for producing a surface structure.

An apparatus shown in FIG. 1 for producing a surface structure in the region of the surface 1 of a roller 2 is essentially composed of a beam generator 4 that generates an electron beam 3, of a lens system 5, as well as of a vacuum chamber 6 accepting the roller 2. The beam generator 4 and the lens system 5 are arranged in a beam equipment 7 that is subdivided into a main chamber 8 and into an intermediate chamber 9. The beam generator 4 as well as a focal length adjustment 10 that forms a part of the lens system 5 are arranged in the main chamber 8. It is essentially a changing diaphragm 11 as well as a focusing 12 that are arranged in the intermediate chamber 9, these forming the essential elements of the lens system 5 together with the focal length adjustment 10. The main chamber 8 is separated from the intermediate chamber 9 by a vacuum choke 13 that comprises a clearance 14 that is essentially centrally arranged and allows the passage of the electron beam 3. The vacuum choke 13 makes it possible to provide different pressure conditions in the main chamber 8 and in the intermediate chamber 9. For example, it is thus possible to achieve a pressure of approximately 8×0.00001 bar in the main chamber 8 and a pressure of approximately 8×0.001 bar in the intermediate chamber 9.

Figure 2:
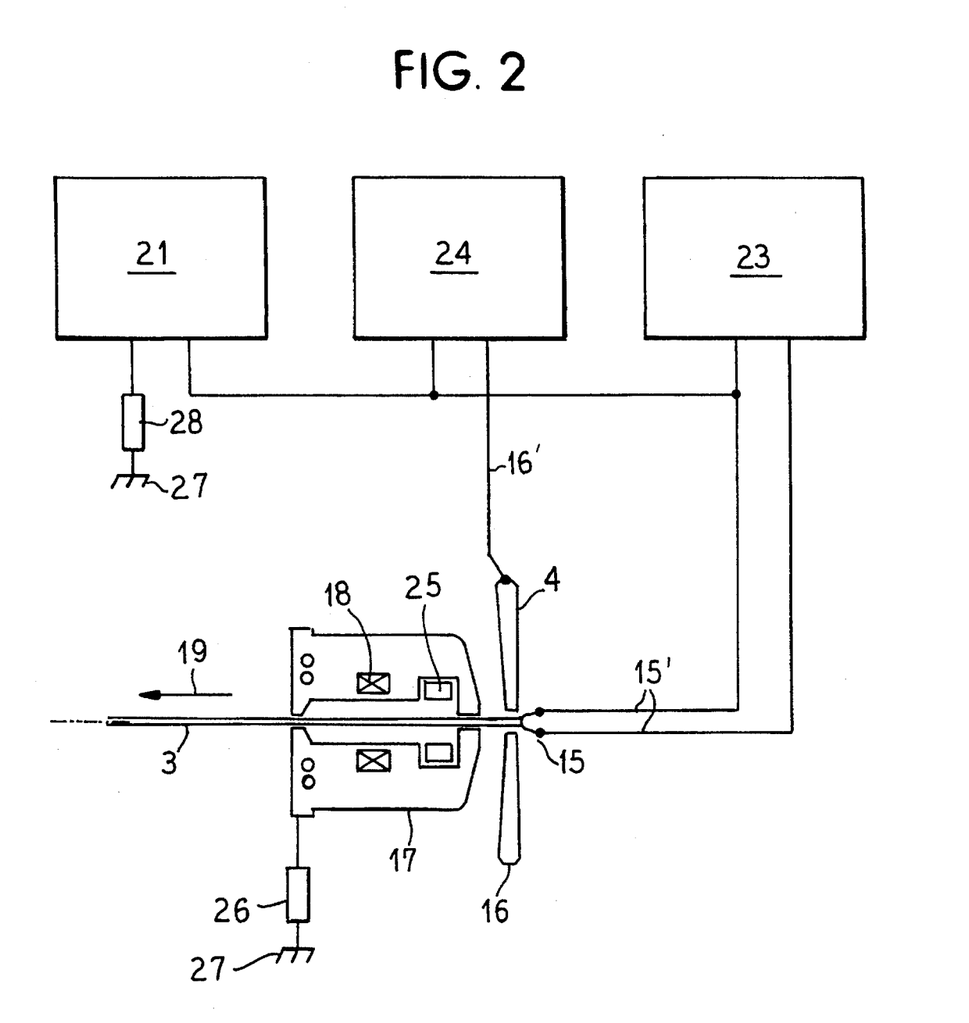
FIG. 2 is a schematic illustration of the beam generation.

The beam generator 4 is essentially composed of a cathode 15, of a wehnelt cylinder 16, as well as of an anode 17. An anode centerer 18 that aligns the electron beam 3 is arranged in the region of the anode 17. A follow-up centerer 20 that likewise undertakes the alignment of the electron beam 3 and avoids stray losses is arranged following the anode 17 in the propagation direction 19 of the electron beam 3. The cathode 15 is connected via lines 15' to a high-voltage unit 21 shown in FIG. 2 that generates a voltage up to approximately −50 kilovolts. A typical value lies at approximately −35 kilovolts. Recesses 22 having a typical depth of approximately 7 micrometers can be produced with such a voltage given an acting duration of approximately 1 microsecond on the surface 1. Given a reduction of the high-voltage to approximately −25 kilovolts, the typical depth of the recesses 22 amounts to approximately 3 through 4 micrometers. Over and above this, the cathode 15 is connected to a filament current supply 23 shown in FIG. 2. The wehnelt cylinder 16 is supplied via a line 16' by a voltage generator 24 that generates a potential of approximately −1000 volts compared to the voltage adjacent at the cathode 15. An ion barrier 25 that diverts ions incident in the region of the anode 17 out of the region of the electron beam 3 is provided in the region of the anode 17 in addition to the centering coils that form the anode centerer 18. The anode 17 is connected to a ground terminal 27 via a resistor 26. Over and above this, the high-voltage unit 21 is also connected to ground via a resistor 28. In particular, tungsten wires are suitable as a material for the cathode 15.

The focal length adjustment 10 is composed of a first zoom lens 29 and of a second zoom lens 30 that are arranged following one another in the propagation direction 19. The first zoom lens 29 is composed of a dynamic lens 31 as well as of a static lens 32. The second zoom lens 30 is fashioned without a dynamic lens 31. The vacuum in the main chamber 8 is maintained by a vacuum pump 33 and the vacuum in the intermediate chamber 9 is maintained by a vacuum pump 34. In particular, it has been envisioned to fashion the pumps 33 and 34 as turbomolecular pumps. A centerer 35 that avoids stray losses of the electron beam 3 is provided in the intermediate chamber 9 between the changing diaphragm 11 and the focusing 12. The focusing 12 is essentially composed of a static lens 36 and of a dynamic lens 37. Both the dynamic lens 37 as well as the dynamic lens 31 are respectively arranged in the proximity of the inside surfaces of the static lenses 32, 36 that face toward the electron beam 3. The beam equipment 7 comprises an exit aperture 38 in the region of its limitation facing toward the vacuum chamber 6, a nozzle 39 being arranged in the region of this exit aperture 38.

Figure 3:
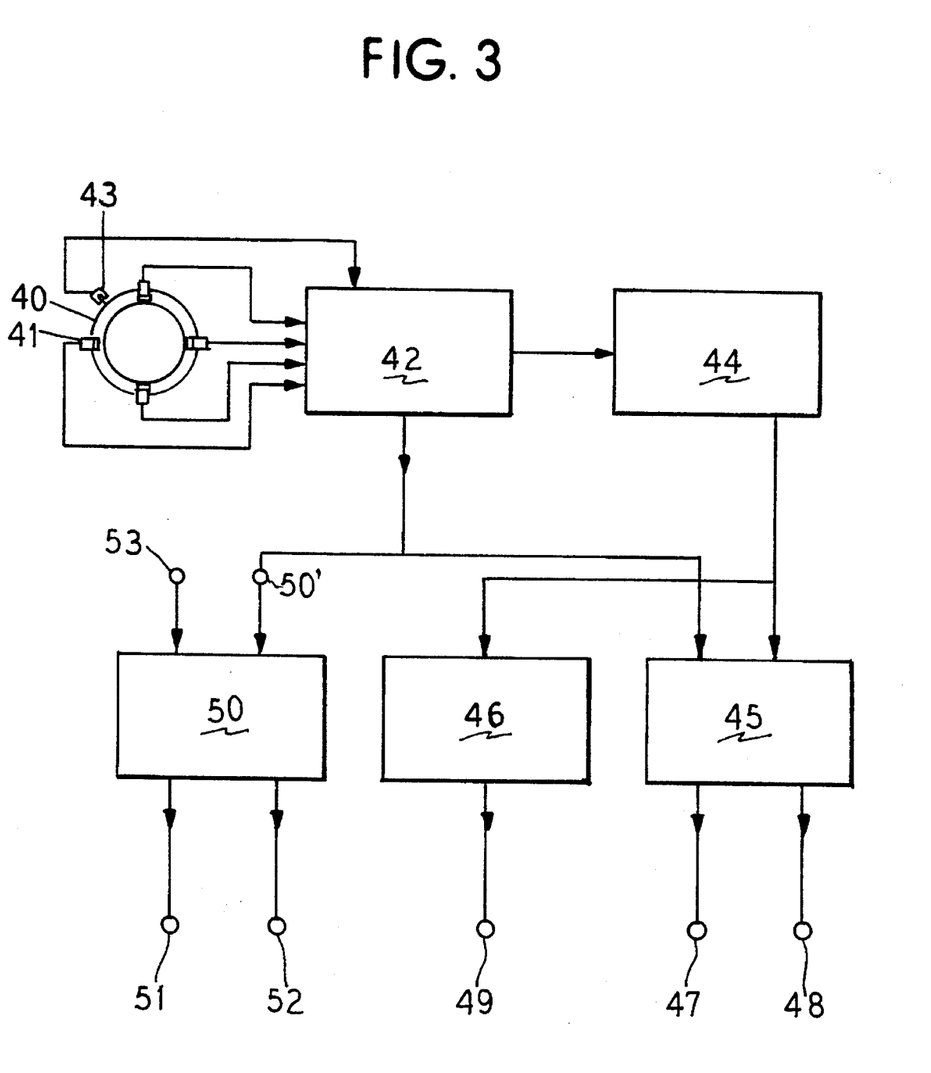
FIG. 3 is a block circuit diagram of the control of the apparatus.

A raster disc 40 that is synchronized with the rotational movement of the roller 2 and is connected via sensors 41 to an evaluation 42 is provided in FIG. 3 for controlling the reproducible placement of the recesses 22 on the surface 1 of the roller 2. The evaluation 42 makes a clock available for following control elements which enables the exact acquisition of the actual position of the roller 2. The defined definition of a reference point ensues with the assistance of a zero point acquisition 43. The evaluation unit 42 is connected to a control 44 that, for example, can be fashioned as a phase-locked loop circuit. The control 44 feeds a saw-tooth generator 45 as well as a feed clock generator 46. The saw-tooth generator 45 comprises an engraving saw-tooth terminal 47 as well as a feed saw-tooth terminal 48. The feed clock generator 46 is provided with a feed stepping motor terminal 49. The evaluation unit 42 is connected to the saw-tooth generator 45 via a control terminal 50' with a lens drive 50. The lens drive 50 comprises a zoom lens terminal 51, a sharpness lens terminal 52 and a control input 53.

Figure 4:
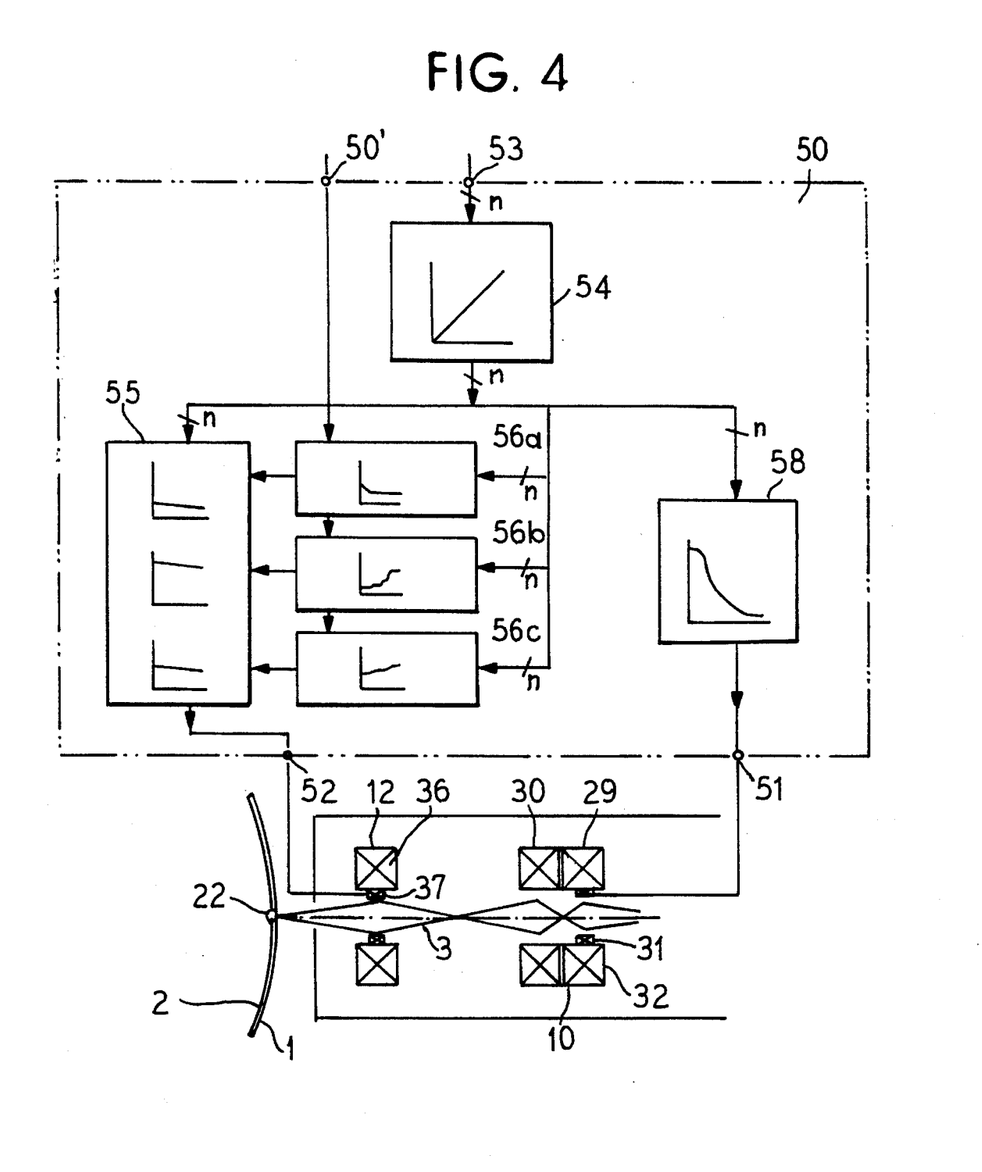
FIG. 4 is a block circuit diagram of the lens drive.

According to FIG. 4, a plurality of characteristics elements for signal shaping are provided for driving the lens system 5, these forming the lens drive 50. The drive of a sharpness element 55, of timer units 56a, 56b, 56c as well as of a zoom element 58 ensues via a linearization 54 connected to the control input 53.

The control signal adjacent at the control input 53 influences the geometry of the recesses 22 to be produced. The input actuating variable is converted into setting values for the focusing 12 on the basis of characteristics in the sharpness element 55. The setting values are subsequently supplied to the dynamic lens 37 of the focusing 12. The characteristic of the zoom element 58 converts the actuating variable into corresponding setting values for the focal length adjustment 10 that are supplied to the dynamic lens 31.

A compensation of the relative motion of the textured roller 2 with respect to the nozzle 39 can be undertaken via a follow-up of the electron beam 3. As a result thereof, the electron beam 3 remains exactly aligned to a preselected region and leads to the formation of extremely symmetrical recesses 22.

As a result of the extremely short time delays in the drive of the lens system 5, approximately 150,000 recesses 22 can be produced per second. Given employment of fast control devices, it is also possible to realize clock frequencies for the production of 300,000 through 600,000 recesses per second. In order to achieve these clock frequencies, the roller 2 is turned with approximately 10 revolutions per second and is moved axially with a corresponding speed. Given a time span of approximately 16 microseconds for producing a recess 22, a complete roller 2 can be processed within approximately 45 minutes. The power consumption by the roller 2 amounts to only about 500 Watts in this time. Undesired modifications in the region of the surface 1 due to thermal stresses or similar processes are thus precluded with high probability.

Figure 5:
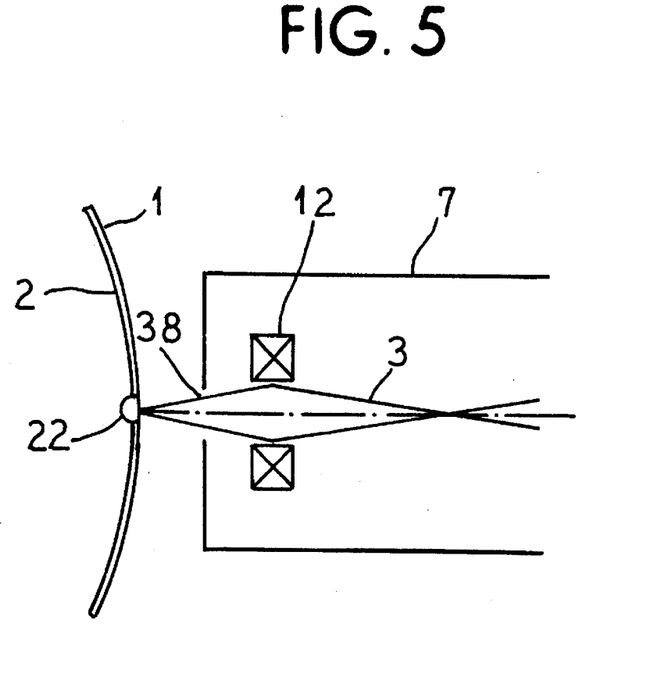
FIG. 5 is a schematic illustration of a focused electron beam.
Figure 6:
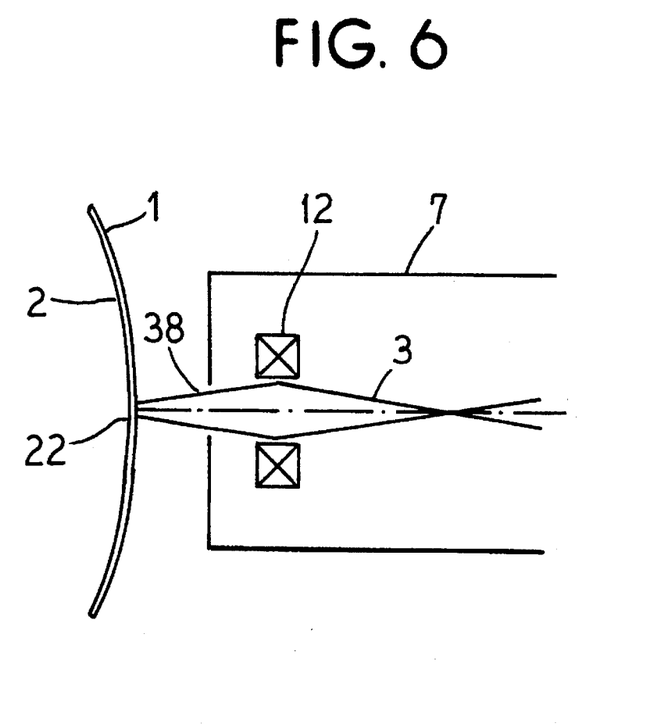
FIG. 6 is a schematic illustration of a defocused electron beam.

FIG. 5 shows the focused electron beam 3 for producing a recess 22. In this focusing state, the electron beam 3 has a high energy density on the surface 1. The electron beam 3 is shown defocused in FIG. 6 and, due to the lower energy density in comparison to the focusing of FIG. 5, is not in the position to cause structural modifications in the region of the surface 1 during the implementation of a motion. This defocused condition of the electron beam 3 makes it possible to undertake a change in position of the electron beam 3 relative to the surface 1 during the continued motion of the roller 2 without damaging the surface region respectively present between two recesses 22 to be produced.

Figure 7:
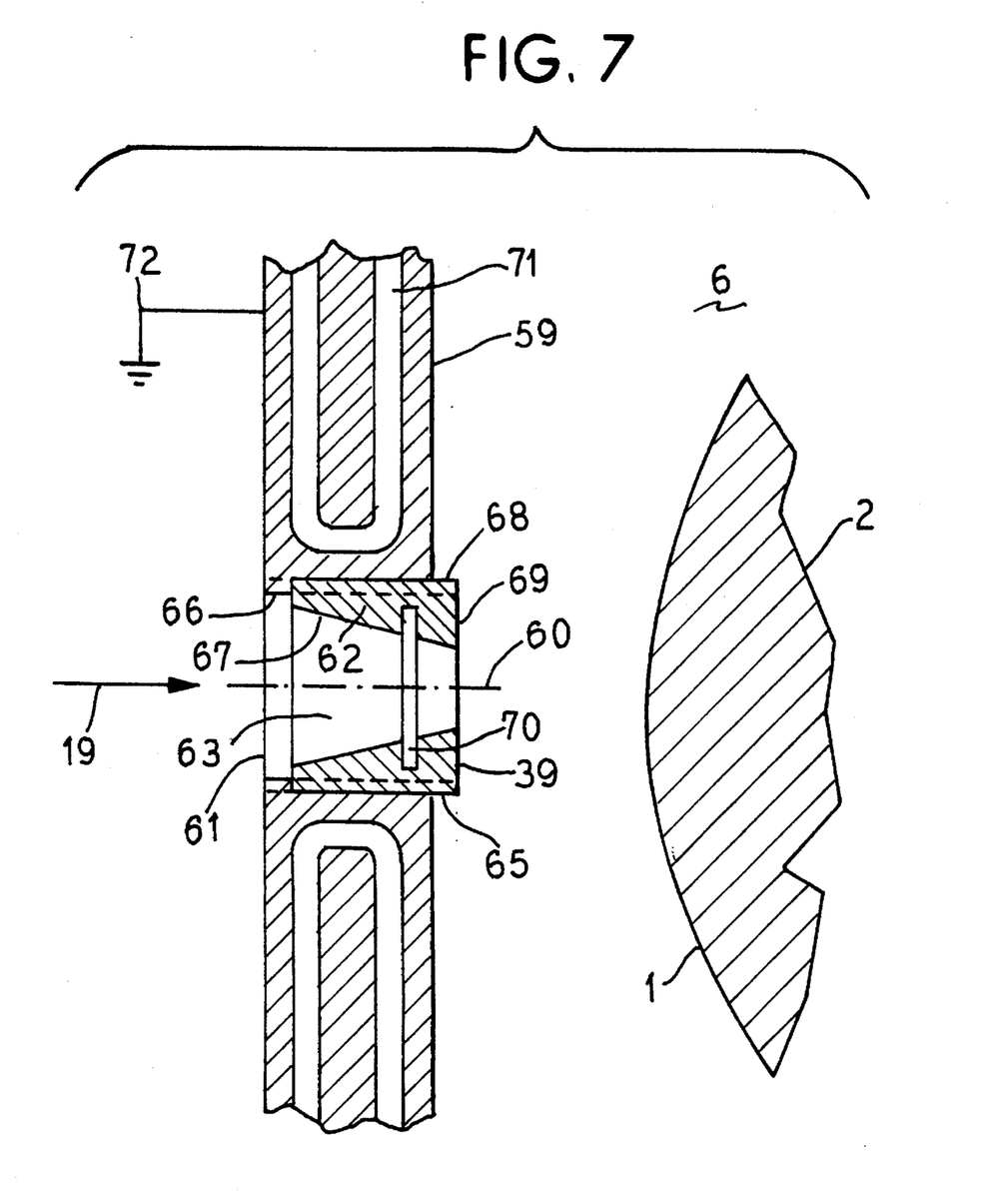
FIG. 7 is a partial illustration of a section through a wall in whose region a nozzle projecting beyond the wall is arranged.

FIG. 7 shows an enlarged cross section through a wall 59 that separates the beam equipment 7 from the vacuum chamber 6. The nozzle 39 whose longitudinal axis 60 extends in propagation direction 19 of the electron beam 3 is arranged in the wall 59. This nozzle 39 is arranged within a passage 61 of the wall 59 which forms the exit aperture 38 region-wise. The nozzle 39 is essentially composed of a nozzle jacket 62 that essentially centrally surrounds a nozzle channel 63. The nozzle channel 63 tapers in the direction toward the vacuum chamber 6. The nozzle 39 is essentially cylindrically fashioned in the region of an outer limitation 64 and has an outside thread 65 engaging into an inside thread 66 of the wall 59.

The nozzle jacket 62 is essentially composed of a nozzle base 67 arranged facing away from the vacuum chamber 6 that merges via a taper 68 into an end segment 69 arranged facing toward the vacuum chamber 6. With respect to the longitudinal axis 60, the taper 68 is radially limited by a channel 70. Instead of the inside channel shown in FIG. 7, it is also possible to fashion the channel 70 as an outside channel. The end segment 69 of the nozzle 39 projects beyond the wall 59 in the direction toward the vacuum chamber 6. Coolant lines 79 wherein a coolant circulates in order to avoid an undesirable heating-up are arranged inside the wall 59.

In order to assure high temperature resistance, the nozzle 39 is preferably composed of a stressable material, for example steel or tantalum. Extremely good durability is established particularly given tantalum. In order to avoid static charges, the wall 59 is connected to a discharge terminal 72. In particular, it has been envisioned to ground the discharge terminal 72. A static charging of the nozzle 39 and, thus, an undesirable deflection of the electrons is avoided by the connection to the discharge terminal 72, particularly given charging of the nozzle 39 with the defocused electron beam.

During operation of the beam equipment 7 for generating a surface structure on the roller 2, the electron beam 3 is conducted through the nozzle 39 in the direction toward the roller 2 and is focused such that a recess potentially surrounded by a crater wall is produced on the roller surface 2. In this focused condition, the electron beam 3 is bundled such by the focusing 12 that, except for a slight number of stray electrons, no charging of the nozzle 39 occurs. After an adequate influencing time of the electron beam 3 on the roller 2 during which the electron beam 3 potentially follows the rotational movement of the roller 2 in order to produce a sharp contouring, the positioning of the center line of the electron beam 3 in which another recess is to be produced ensues during the change of this positioning, the electron beam 3 is defocused such with the assistance of the focusing 12 that no material modifications occur in the region of the moving roller 2. The defocusing of the electron beam 3 ensues such that a prescribable edge region of the electron beam 3 impinges the nozzle jacket 62. In particular, it is possible to prescribe the defocusing such that an incidence of electrons ensues essentially in the region of the end segment 69. Due to the incident electrons, the end segment 69 experiences a considerable heating that leads to an incandescence. Due to this incandescence, that lasts approximately 15 microseconds dependent on the time span required for changing an engraving location on the roller 2, a precipitation of material particles is avoided as a consequence of the high temperature and material particles that have already sintered on are evaporated. Due to the combination of the taper 68 with the channel 70, the dissipation of thermal energy from the region of the end segment 69 into the region of the nozzle base 67 and, thus, the cooling resulting from the heat transmission to the wall 59 are substantially reduced. In order to produce a further engraving on the surface 1 of the roller 2, a renewed focusing of the electron beam 3 ensues following the defocusing phase. A cyclical change between engraving and cleaning phases is thus carried out.

Although modifications and changes may be suggested by those skilled in the art, it is the intention of the inventors to embody within the patent warranted hereon all changes and modifications as reasonably and properly come within the scope of their contribution to the art.

I claim:

1. A method for operating an apparatus for engraving a workpiece with an electron beam, which apparatus includes a work chamber in which the workpiece is received in which the electron beam is generated and a vacuum chamber with a passageway structure with an opening through which a focused electron beam passes separating the vacuum and work chambers, comprising the steps of:

generating an electron beam at one end of the vacuum chamber;

during an engraving period, focusing the electron beam relative to the workpiece and transmitting the focused electron beam through the passageway structure opening so as to engrave the workpiece; and during a cleaning interval other than during an engraving period, defocusing the electron beam relative to the workpiece and causing the defocused electron beam to impinge on the passageway structure about the opening thereby to cause the passageway structure to heat up and cause contaminants thereon to be eliminated.

2. The method of claim 1, wherein at least one region of the passageway structure is rendered incandescent during the cleaning interval.

3. The method of claim 2, wherein the passageway structure comprises a nozzle whose opening tapers in narrowing fashion proceeding from the vacuum chamber toward the work chamber and a region of the nozzle is rendered incandescent during the cleaning interval.

4. The method of claim 3, wherein an end segment of the nozzle arranged in the direction toward the workpiece is rendered incandescent.

5. The method of claim 1 wherein the heating of the passageway structure is implemented in cyclical cleaning intervals.

6. The method of claim 5, wherein each cleaning interval respectively lies within a time span that is required for a change in position of the electron beam from one charging location to another charging location on the workpiece.

7. The method of claim 1, wherein a region of passageway structure is cooled during the cleaning interval via thermal contact with the wall.

8. The method of claim 1, where a time span of approximately 5 through 20 microseconds is provided for the cleaning interval.

9. The method of claim 1, wherein the passageway structure is electrically connected to a discharge terminal in order to avoid electrostatic charging.

10. The method of claim 1, wherein the workpiece is a drum.

11. An apparatus for producing surface structures on a workpiece with an electron beam, comprising:

a work chamber in which the workpiece is received;

a vacuum chamber adjacent the work chamber;

a wall separating the work and vacuum chambers;

electron beam generating equipment operatively positioned within the vacuum chamber;

an electron beam focusing apparatus operatively associated with the electron beam to control focusing of the electron beam;

a nozzle operatively positioned in the wall separating the work and vacuum chambers and including an opening through which an electron beam can pass, the nozzle being positioned and configured to have an opening of a size such that during engraving of the workpiece, a focused electron beam passes through the opening while during a cleaning period an electron beam which is sufficiently defocused relative to the workpiece impinges upon the nozzle to cause same to heat up to eliminate contaminants thereon, the nozzle being shaped and configured to provide a vacuum throttle between the vacuum chamber and the work chamber.

12. The apparatus of claim 11, wherein at least regions of the nozzle are composed of tantalum.

13. The apparatus of claim 11, wherein at least regions of the nozzle are made of steel.

14. The apparatus of claim 11, wherein the nozzle is secured in the wall in a manner operative to provide between the nozzle and the wall thermal transmission, and the wall comprises at least one coolant line.

15. The apparatus of claim 11, wherein the workpiece is a drum.

16. The apparatus of claim 11, wherein the vacuum chamber comprises first and second subvacuum chambers and the electron beam focusing apparatus comprises first and second lens systems, the first and subvacuum chamber containing the electron beam generated apparatus and the first lens system and the second subvacuum chamber contains the second lens system, the first and second subvacuum chambers being separated by a vacuum chamber dividing wall having an opening through which the electron beam can pass, the first and second subvacuum chambers being configured to be capable of being maintained at different pressures.

17. The apparatus of claim 16 further comprising a diaphragm operatively contained within the second subvacuum chamber and positioned between the first and second lens systems.

18. The apparatus of claim 11, wherein the nozzle is funnel shaped with a smaller diameter end segment that projects into the work chamber, the nozzle being sized such that the defocused electron beam impinges a region encompassing the end segment.

* * * * *